(12) United States Patent
Hong

(10) Patent No.: US 12,118,891 B2
(45) Date of Patent: Oct. 15, 2024

(54) FLIGHT PATH CONFIGURATION METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 890 days.

(21) Appl. No.: 17/266,571

(22) PCT Filed: Aug. 6, 2018

(86) PCT No.: PCT/CN2018/099011
§ 371 (c)(1),
(2) Date: Feb. 5, 2021

(87) PCT Pub. No.: WO2020/029025
PCT Pub. Date: Feb. 13, 2020

(65) Prior Publication Data
US 2021/0295713 A1    Sep. 23, 2021

(51) Int. Cl.
*G08G 5/00* (2006.01)
(52) U.S. Cl.
CPC ........... *G08G 5/003* (2013.01); *G08G 5/0013* (2013.01); *G08G 5/006* (2013.01); *B64U 2201/00* (2023.01)
(58) Field of Classification Search
CPC ...... G08G 5/003; G08G 5/0013; G08G 5/006; G08G 5/0026; G08G 5/0034;
(Continued)

(56) References Cited

U.S. PATENT DOCUMENTS

2006/0077255 A1    4/2006  Cheng
2016/0321503 A1   11/2016  Zhou
(Continued)

FOREIGN PATENT DOCUMENTS

CN    104158607 A    11/2014
CN    106717081 A     5/2017
(Continued)

OTHER PUBLICATIONS

CN 1st Office Action in Application No. 201880001649.1, mailed on Jul. 31, 2020.
(Continued)

*Primary Examiner* — Shon G Foley
(74) *Attorney, Agent, or Firm* — Syncoda LLC; Feng Ma

(57) ABSTRACT

A flight path configuration method includes: acquiring flight path information of an unmanned aerial vehicle, wherein the unmanned aerial vehicle is in an idle state; determining a tracking area where the unmanned aerial vehicle is located, wherein at least one base station is located in the tracking area; and sending first paging signaling to the base station, wherein the first paging signaling includes the flight path information, and the first paging signaling is used to instruct the base station to send the flight path information to the unmanned aerial vehicle by means of preset signaling. The configuration of a flight path can be completed on the basis of an operator's network without establishing a proprietary link, thereby simplifying the configuration process.

20 Claims, 8 Drawing Sheets

(58) Field of Classification Search
CPC .. G08G 5/0069; G08G 5/0082; B64C 39/024; B64U 2101/00; H04B 7/18506; H04W 68/00
See application file for complete search history.

(56) References Cited

U.S. PATENT DOCUMENTS

2017/0257842 A1   9/2017  Hessler et al.
2018/0247544 A1*  8/2018  Mustafic .............. G08G 5/0034

FOREIGN PATENT DOCUMENTS

| | | | |
|---|---|---|---|
| CN | 107017940 A | 8/2017 | |
| CN | 107300927 A | 10/2017 | |
| CN | 107922050 A | 4/2018 | |
| CN | 108064360 A | 5/2018 | |
| CN | 108064453 A | 5/2018 | |
| CN | 108064465 A | 5/2018 | |
| CN | 108370556 A | 8/2018 | |
| EP | 2278732 A2 * | 1/2011 | ......... H04B 7/18506 |
| KR | 101668640 B1 | 10/2016 | |
| KR | 101837979 B1 | 3/2018 | |
| WO | 2016141542 A1 | 9/2016 | |
| WO | 2018053691 A1 | 3/2018 | |

OTHER PUBLICATIONS

International Search Report in Application No. PCT/CN2018/099011, mailed on May 10, 2019.
Europe Extended European Search Report in Application No. 18928994.5, mailed on Mar. 11, 2022.
India office action in application No. 202127008957, mailed on Jun. 19, 2024.

* cited by examiner

FLIGHT PATH CONFIGURATION METHOD AND DEVICE

CROSS-REFERENCE TO RELATED APPLICATIONS

The present application is a national stage of International Application No. PCT/CN2018/099011 filed on Aug. 6, 2018, the disclosure of which is hereby incorporated by reference in its entirety.

TECHNICAL FIELD

The present disclosure involves the field of communication technology, and specifically relates to a flight path configuration method, a flight path configuration apparatus, an electronic device, and a computer-readable storage medium.

BACKGROUND

In the related art, when a flight path is configured for an unmanned aerial vehicle, flight path information needs to be sent to the unmanned aerial vehicle through a dedicated link, for example, through a WiFi connection with the unmanned aerial vehicle or relayed by a satellite.

The current manner of configuring a flight path for the unmanned aerial vehicle requires to establish a dedicated link, and the configuration process is relatively cumbersome.

SUMMARY

In view of this, embodiments of the present disclosure propose a flight path configuration method, a flight path configuration apparatus, an electronic device, and a computer-readable storage medium.

According to a first aspect of the embodiments of the present disclosure, there is provided a flight path configuration method, including:
  acquiring flight path information of an unmanned aerial vehicle, wherein the unmanned aerial vehicle is in an idle state;
  determining a tracking area where the unmanned aerial vehicle is located, wherein at least one base station is located in the tracking area; and
  sending a first paging signaling to the base station, wherein the first paging signaling contains the flight path information, and the first paging signaling is used to instruct the base station to send the flight path information to the unmanned aerial vehicle through a preset signaling.

Optionally, the acquiring flight path information of an unmanned aerial vehicle includes:
  acquiring the flight path information from a terminal running an unmanned aerial vehicle management system, wherein the unmanned aerial vehicle management system is used to configure the flight path information for the unmanned aerial vehicle.

Optionally, the determining a tracking area where the unmanned aerial vehicle is located includes:
  receiving update information about the tracking area of the unmanned aerial vehicle;
  determining the tracking area where the unmanned aerial vehicle is located based on the update information.

Optionally, the preset signaling includes at least one of:
a second paging signaling, a radio resource control signaling, and a medium access control layer control unit.

According to a second aspect of the embodiments of the present disclosure, there is provided a flight path configuration method, including:
  receiving a first paging signaling sent by a core network, wherein the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;
  generating the preset signaling based on the first paging signaling; and
  sending the flight path information to the unmanned aerial vehicle through the preset signaling.

Optionally, the method further includes:
  receiving update request information for the tracking area generated when the tracking area of the unmanned aerial vehicle changes;
  sending the update request information to the core network.

Optionally, the preset signaling includes at least one of:
a second paging signaling, a radio resource control signaling, and a medium access control layer control unit.

According to a third aspect of the embodiments of the present disclosure, there is provided a flight path configuration method, including:
  receiving a preset signaling sent by a base station, wherein the preset signaling is generated by the base station according to a first paging signaling sent by a core network, the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;
  extracting the flight path information from the preset signaling; and
  configuring a flight path based on the flight path information.

Optionally, the method further includes:
  generating update information for the tracking area when the tracking area changes;
  sending the update information to the core network through the base station.

Optionally, the preset signaling includes at least one of:
a second paging signaling, a radio resource control signaling, and a medium access control layer control unit.

According to a fourth aspect of the embodiments of the present disclosure, there is provided a flight path configuration apparatus, including:
  a path acquiring module, configured to acquire flight path information of an unmanned aerial vehicle, wherein the unmanned aerial vehicle is in an idle state;
  an area determining module, configured to determine a tracking area where the unmanned aerial vehicle is located, wherein at least one base station is located in the tracking area; and
  a first sending module, configured to send a first paging signaling to the base station, wherein the first paging signaling contains the flight path information, and the first paging signaling is used to instruct the base station to send the flight path information to the unmanned aerial vehicle through a preset signaling.

Optionally, the path acquiring module is configured to acquire the flight path information from a terminal running an unmanned aerial vehicle management system, wherein the unmanned aerial vehicle management system is used to configure the flight path information for the unmanned aerial vehicle.

Optionally, the area determining module includes:
an information receiving sub-module, configured to receive update information about the tracking area of the unmanned aerial vehicle;
an area determining sub-module, configured to determine the tracking area where the unmanned aerial vehicle is located based on the update information.

Optionally, the preset signaling includes at least one of:
a second paging signaling, a radio resource control signaling, and a medium access control layer control unit.

According to a fifth aspect of the embodiments of the present disclosure, there is provided a flight path configuration apparatus, including:
a first receiving module, configured to receive a first paging signaling sent by a core network, wherein the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;
a signaling generating module, configured to generate the preset signaling based on the first paging signaling; and
a second sending module, configured to send the flight path information to the unmanned aerial vehicle through the preset signaling.

Optionally, the apparatus further includes:
an information receiving module, configured to receive update request information for the tracking area generated when the tracking area of the unmanned aerial vehicle changes;
an information sending module, configured to send the update request information to the core network.

Optionally, the preset signaling includes at least one of:
a second paging signaling, a radio resource control signaling, and a medium access control layer control unit.

According to a sixth aspect of the embodiments of the present disclosure, there is provided a flight path configuration method, including:
a second receiving module, configured to receive a preset signaling sent by a base station, wherein the preset signaling is generated by the base station according to a first paging signaling sent by a core network, the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;
an information extracting module, configured to extract the flight path information from the preset signaling; and
a path configuring module, configured to configure a flight path based on the flight path information.

Optionally, the apparatus further includes:
an information generating module, configured to generate update information for the tracking area when the tracking area changes;
an information update module, configured to send the update information to the core network through the base station.

Optionally, the preset signaling includes at least one of:
a second paging signaling, a radio resource control signaling, and a medium access control layer control unit.

According to a seventh aspect of the embodiments of the present disclosure, there is provided an electronic device, including:
a processor;
memory for storing instructions executable by the processor,
wherein the processor is configured to implement the method according to any one of the above embodiments.

According to an eighth aspect of the embodiments of the present disclosure, there is provided a computer-readable storage medium with computer programs stored thereon, wherein the program implements steps in the method according to any one of the above embodiments when executed by a processor.

According to embodiments of the present disclosure, as for an unmanned aerial vehicle in an idle state, since no communication connection is established between the unmanned aerial vehicle and a base station, flight path information from a core network cannot be directly sent to the unmanned aerial vehicle through the base station. Therefore, a tracking area where the unmanned aerial vehicle is located can be determined first, and then a first paging signaling containing the flight path information can be sent to the base station in the tracking area, and the base station is instructed to send the flight path information to the unmanned aerial vehicle through a preset signaling through the first paging signaling, so that the flight path information can be sent from the core network to the unmanned aerial vehicle in the idle state, and thus the unmanned aerial vehicle configures the flight path based on the flight path information. Compared with related technologies, the configuration of the flight path can be completed based on the operator's network, without establishing a dedicated link, and the configuration process is relatively simple.

BRIEF DESCRIPTION OF THE DRAWINGS

In order to more clearly explain the technical solutions in the embodiments of the present application, the following will briefly introduce the drawings used in the description of the embodiments. Obviously, the drawings in the following description are only some embodiments of the present application. For those of ordinary skill in the art, other drawings may be obtained based on these drawings without creative labor.

DETAILED DESCRIPTION

The technical solutions in the embodiments of this application will be clearly and completely described below in conjunction with the drawings in the embodiments of this application. Obviously, the described embodiments are only a part of the embodiments of this application, not all embodiments. Based on the embodiments in this application, all other embodiments obtained by those of ordinary skill in the art without creative work fall within the protection scope of this application.

Figure 1:
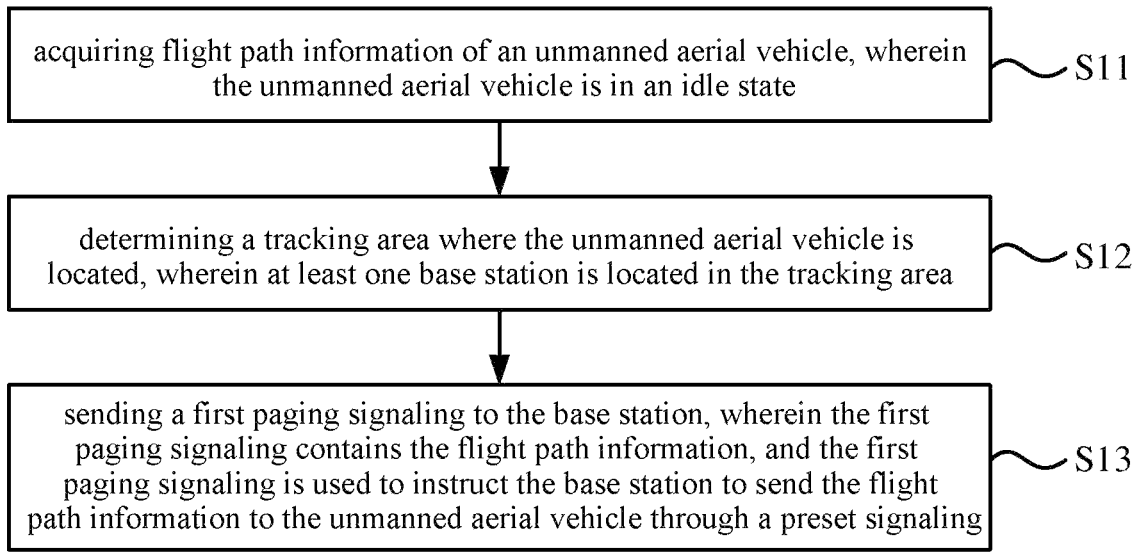
FIG. 1 is a schematic flowchart showing a method for configuring a flight path according to an embodiment of the present disclosure.

FIG. 1 is a schematic flowchart illustrating a method for configuring a flight path according to an embodiment of the present disclosure. The flight path configuration method shown in this embodiment can be applied to a core network. The core network can communicate with a base station. The base station can communicate with a user device. The user device can be an unmanned aerial vehicle. The unmanned aerial vehicle may be a drone, an unmanned airship, or the like. The base station and the user device may communicate based on LTE (Long Term Evolution) communication or NR (New Radio) communication.

As shown in FIG. 1, the flight path configuration method includes following steps.

In step S11, flight path information of an unmanned aerial vehicle is acquired, wherein the unmanned aerial vehicle is in an idle state.

In one embodiment, the flight path information can be configured by an unmanned aerial vehicle management system. The unmanned aerial vehicle management system can be, for example, UTM (UAS Traffic Management). The full name of UAS is Unmanned Aircraft System. The unmanned aerial vehicle management system can run on a terminal, and a communication connection may exist between the core network and the terminal, and then the flight path information of the unmanned aerial vehicle can be obtained from the terminal.

In one embodiment, the unmanned aerial vehicle is in the idle state, which means a state that a communication connection between the unmanned aerial vehicle and the base station is disconnected. Since a communication connection exists between the base station and the core network, the core network can determine whether the communication connection between the unmanned aerial vehicle and the base station is disconnected. For example, when there is data transmission between the unmanned aerial vehicle and the base station, it can be determined that there is a communication connection between the unmanned aerial vehicle and the base station. When there is no data transmission between the unmanned aerial vehicle and the base station, it can be determined that a communication connection between the unmanned aerial vehicle and the base station is disconnected, that is, the unmanned aerial vehicle is in an idle state.

In step S12, a tracking area where the unmanned aerial vehicle is located is determined, wherein at least one base station is located in the tracking area.

In one embodiment, one or more base stations can be set in the tracking area (TA). When the tracking area of the unmanned aerial vehicle changes, update request information for the tracking area can be generated and sent to the core network through the base station, and then the core network can determine the tracking area where the unmanned aerial vehicle is located.

In step S13, a first paging signaling is sent to the base station, wherein the first paging signaling contains the flight path information, and the first paging signaling is used to instruct the base station to send the flight path information to the unmanned aerial vehicle through a preset signaling.

In one embodiment, as for an unmanned aerial vehicle in an idle state, since no communication connection is established between the unmanned aerial vehicle and a base station, flight path information from a core network cannot be directly sent to the unmanned aerial vehicle through the base station. Therefore, a tracking area where the unmanned aerial vehicle is located can be determined first, and then a first paging signaling containing the flight path information can be sent to the base station in the tracking area, and the base station is instructed to send the flight path information to the unmanned aerial vehicle through a preset signaling through the first paging signaling, so that the flight path information can be sent from the core network to the unmanned aerial vehicle in the idle state, for the unmanned aerial vehicle to configure the flight path based on the flight path information. Compared with related technologies, the configuration of the flight path can be completed based on the operator's network, without establishing a dedicated link, and the configuration process is relatively simple.

In an embodiment, the format of the first paging signaling may be as shown in Table 1.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |

TABLE 1-continued

| IE/Group Name | Presence | Range | IE type and reference | Semantics description | Criticality | Assigned Criticality |
|---|---|---|---|---|---|---|
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |
| Assistance Data for Paging | O | | 9.2.1.103 | | YES | ignore |
| Paging eDRX Information | O | | 9.2.1.111 | | YES | ignore |
| Extended UE Identity Index Value | O | | 9.2.3.46 | | YES | ignore |
| NB-IoT Paging eDRX Information | O | | 9.2.1.115 | | YES | ignore |
| NB-IoT UE Identity Index value | O | | 9.2.3.47 | | YES | ignore |
| Flight Path Information | O | | 9.2.x.x | | YES | ignore |

The core network may send the first paging signaling to the base station through the S1 interface, and the Flight Path Information in the first paging signaling is the flight path information.

Figure 2:
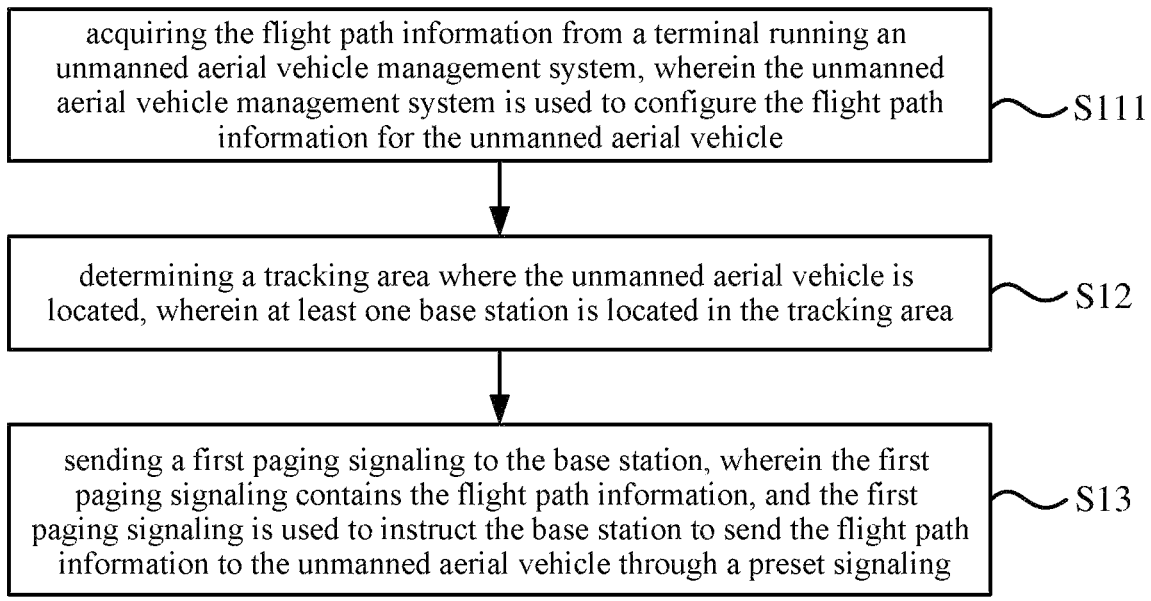
FIG. 2 is a schematic flowchart showing another method for configuring a flight path according to an embodiment of the present disclosure.

FIG. 2 is a schematic flowchart showing another method for configuring a flight path according to an embodiment of the present disclosure. As shown in FIG. 2, based on the embodiment shown in FIG. 1, the acquiring flight path information of an unmanned aerial vehicle includes following steps.

In step S111, the flight path information is acquired from a terminal running an unmanned aerial vehicle management system, wherein the unmanned aerial vehicle management system is used to configure the flight path information for the unmanned aerial vehicle.

In one embodiment, the flight path information can be configured by an unmanned aerial vehicle management system. The unmanned aerial vehicle management system can run on a terminal, and a communication connection may exist between the core network and the terminal, and then the flight path information of the unmanned aerial vehicle can be acquired from the terminal.

The terminal that runs the unmanned aerial vehicle management system can be a server, a remote control and other devices.

Figure 3:
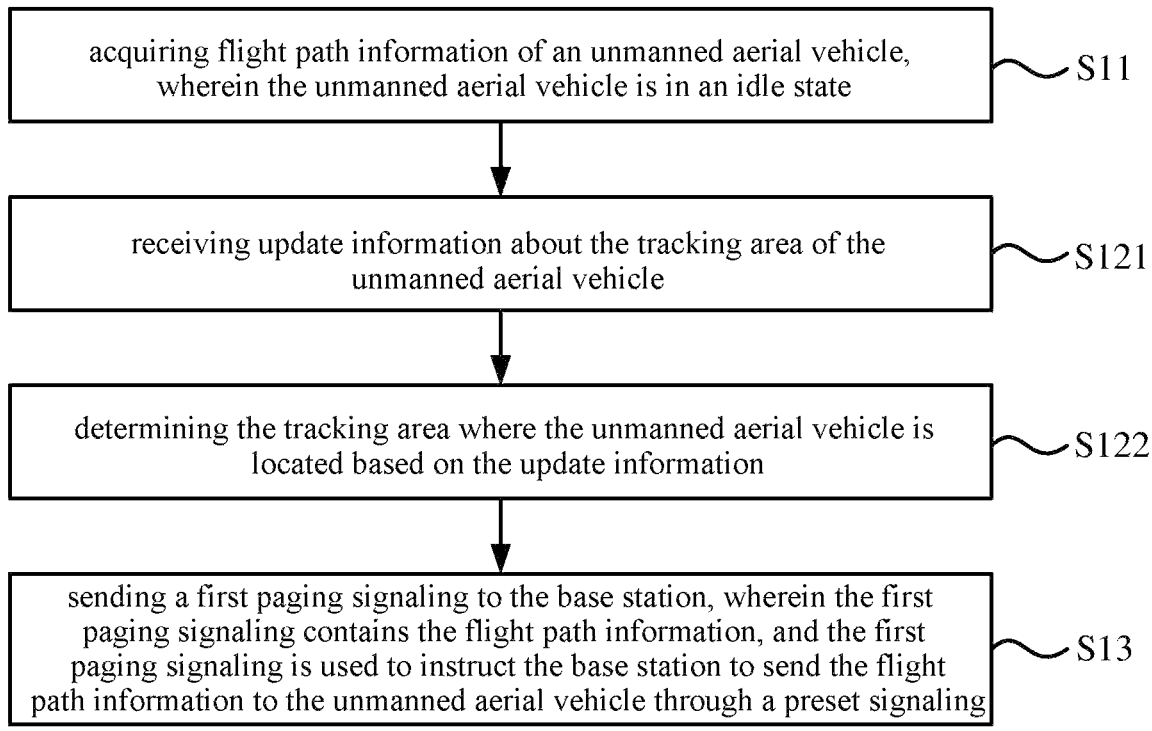
FIG. 3 is a schematic flow chart showing yet another method for configuring a flight path according to an embodiment of the present disclosure.

FIG. 3 is a schematic flow chart showing yet another method for configuring a flight path according to an embodiment of the present disclosure. As shown in FIG. 3, on the basis of the embodiment shown in FIG. 1, the determining a tracking area where the unmanned aerial vehicle is located includes:

in step S121, receiving update information about the tracking area of the unmanned aerial vehicle;

in step S122, determining the tracking area where the unmanned aerial vehicle is located based on the update information.

In one embodiment, the tracking area where the unmanned aerial vehicle is located can change during movement of the unmanned aerial vehicle. When the tracking area where the unmanned aerial vehicle is located changes, the update request information for the tracking area can be generated and sent to the core network through the base station, for the core network to determine the tracking area where the unmanned aerial vehicle is located.

Optionally, the preset signaling includes at least one of: a second paging signaling, a radio resource control signaling, and a medium access control layer control unit.

In an embodiment, the core network may instruct the base station to send the flight path information to the unmanned aerial vehicle through the second paging signaling through the first paging signaling. In this case, the base station may broadcast the second paging signaling, and the identification information of the unmanned aerial vehicle may be included in the second paging signaling, so that when the unmanned aerial vehicle monitors the second paging signaling, it can be determined that the content in the second paging signaling needs to be acquired based on the identification information, for example, the flight path information carried by the second paging signaling is acquired. In this case, even if no communication connection is established between the unmanned aerial vehicle and the base station, the flight path information can still be obtained from the second paging signaling.

In one embodiment, the core network may instruct the base station to send the flight path information to the unmanned aerial vehicle through the Radio Resource Control (RRC) signaling or Media Access Control Control Element (MAC CE) through the first paging signaling. In this case, the base station can establish a communication connection with the unmanned aerial vehicle first, and when there is a communication connection with the unmanned aerial vehicle, the RRC signaling or MAC CE carrying the flight path information is sent to the unmanned aerial vehicle, such that the flight path information is sent to the unmanned aerial vehicle.

Figure 4:
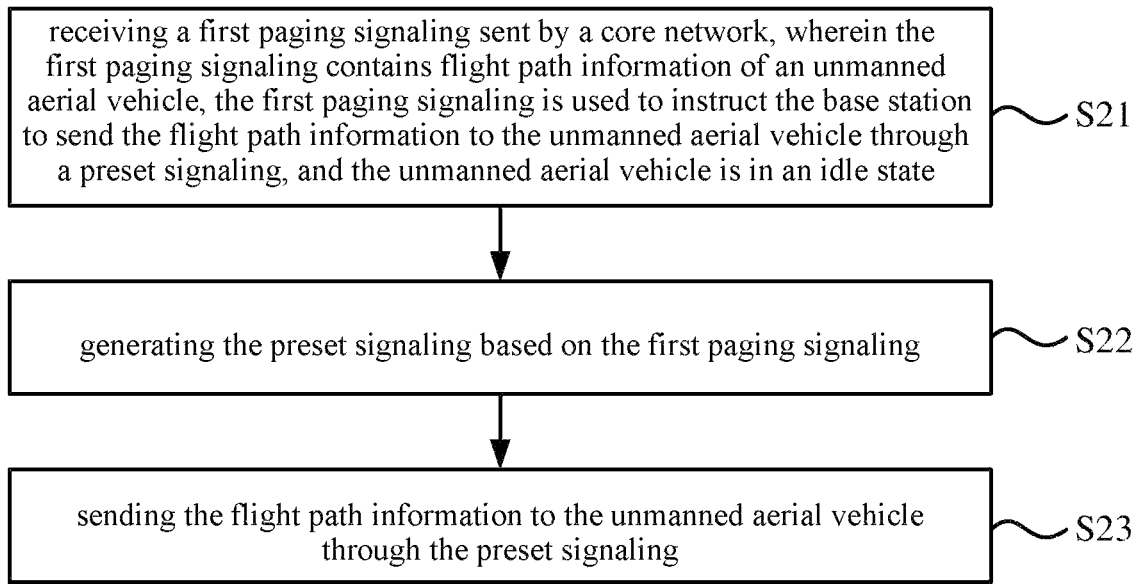
FIG. 4 is a schematic flow chart showing yet another method for configuring a flight path according to an embodiment of the present disclosure.

FIG. 4 is a schematic flow chart showing yet another method for configuring a flight path according to an embodiment of the present disclosure. The flight path configuration method shown in this embodiment can be applied to a base station. The base station can communicate with a core network. The base station can communicate with a user device. The user device can be an unmanned aerial vehicle. The unmanned aerial vehicle may be a drone, an unmanned airship, or the like. The base station and the user device may communicate based on LTE communication or NR communication.

As shown in FIG. 4, the flight path configuration method includes:

in step S21, receiving a first paging signaling sent by a core network, wherein the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;

in step S22, generating the preset signaling based on the first paging signaling; and in step S23, sending the flight path information to the unmanned aerial vehicle through the preset signaling.

In one embodiment, as for an unmanned aerial vehicle in an idle state, since no communication connection is established between the unmanned aerial vehicle and a base station, flight path information from a core network cannot be directly sent to the unmanned aerial vehicle through the base station. Therefore, a tracking area where the unmanned aerial vehicle is located can be determined first, and then a first paging signaling containing the flight path information can be sent to the base station in the tracking area, and the base station is instructed to send the flight path information to the unmanned aerial vehicle through a preset signaling through the first paging signaling.

After receiving the first paging signaling, the base station may generate the preset signaling according to the first paging signaling, and the preset signaling includes the flight path information, and then preset signaling is sent to the unmanned aerial vehicle, so that the flight path information can be sent from the core network to the unmanned aerial vehicle in the idle state, for the unmanned aerial vehicle to configure the flight path based on the flight path information. Compared with related technologies, the configuration of the flight path can be completed based on the operator's network, without establishing a dedicated link, and the configuration process is relatively simple.

Figure 5:
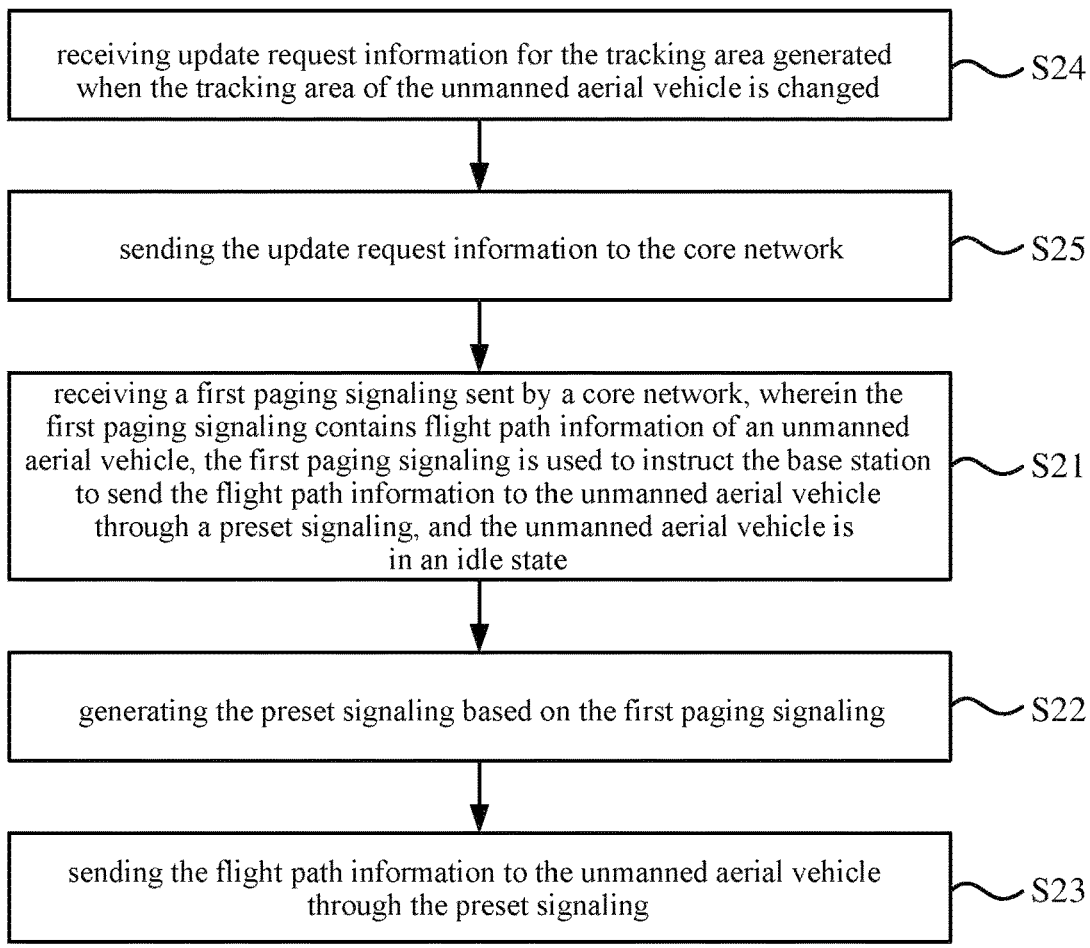
FIG. 5 is a schematic flowchart showing yet another method for configuring a flight path according to an embodiment of the present disclosure.

FIG. 5 is a schematic flowchart illustrating yet another method for configuring a flight path according to an embodiment of the present disclosure. As shown in FIG. 5, based on the embodiment shown in FIG. 4, the flight path configuration method further includes:

in step S24, receiving update request information for the tracking area generated when the tracking area of the unmanned aerial vehicle changes;

in step S25, sending the update request information to the core network.

In one embodiment, the tracking area where the unmanned aerial vehicle is located can change during movement of the unmanned aerial vehicle. When the tracking area where the unmanned aerial vehicle is located changes, the update request information for the tracking area can be generated and sent to the core network through the base station, for the core network to determine the tracking area where the unmanned aerial vehicle is located.

It should be noted that step S24 and step S25 can be executed before step S21 as shown in FIG. 5, or can be executed after step S23. The specific execution sequence is not limited in the present disclosure, step S24 and step S25 can be executed as long as the update request information sent from an unmanned aerial vehicle is received.

Optionally, the preset signaling includes at least one of: a second paging signaling, a radio resource control signaling, and a medium access control layer control unit.

In an embodiment, the base station may broadcast the second paging signaling, and the identification information of the unmanned aerial vehicle may be included in the second paging signaling, so that when the unmanned aerial vehicle monitors the second paging signaling, it can be determined that the content in the second paging signaling needs to be acquired based on the identification information, for example, the flight path information carried by the second paging signaling is acquired. In this case, even if no communication connection is established between the unmanned aerial vehicle and the base station, the flight path information can still be obtained from the second paging signaling.

In one embodiment, the base station can establish a communication connection with the unmanned aerial vehicle first, and when there is a communication connection with the unmanned aerial vehicle, the RRC signaling or MAC CE carrying the flight path information is sent to the unmanned aerial vehicle, such that the flight path information is sent to the unmanned aerial vehicle from the core network.

Figure 6:
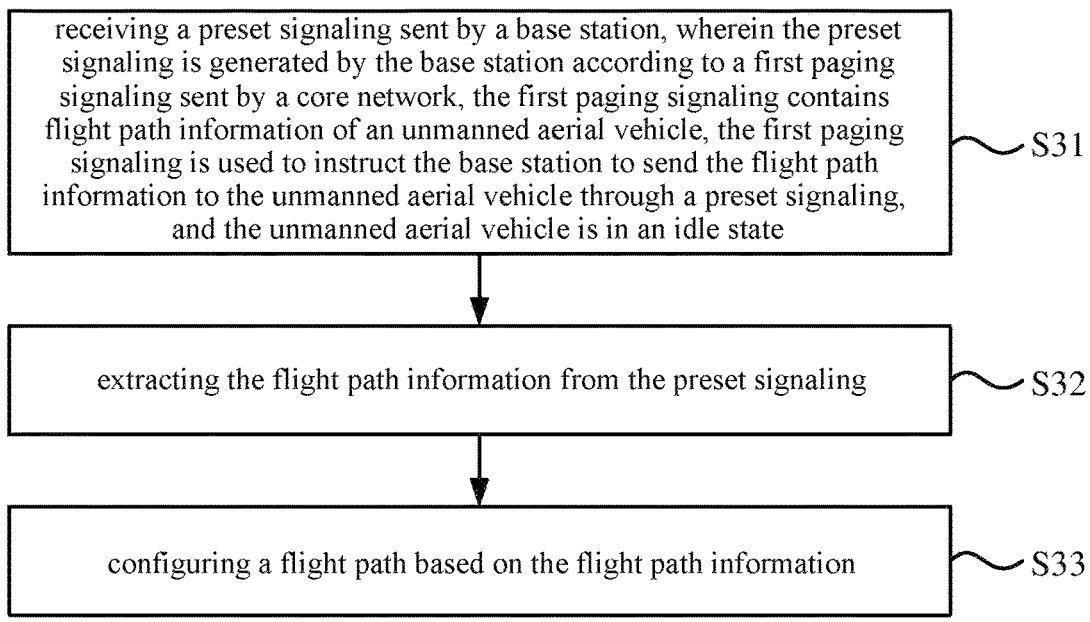
FIG. 6 is a schematic flow chart showing yet another method for configuring a flight path according to an embodiment of the present disclosure.

FIG. 6 is a schematic flow chart showing yet another method for configuring a flight path according to an embodiment of the present disclosure. The flight path configuration method shown in this embodiment can be applied to the unmanned aerial vehicle. The unmanned aerial vehicle may be a drone, an unmanned airship, or the like. The base station and the unmanned aerial vehicle may communicate based on LTE communication or NR communication.

As shown in FIG. 6, the flight path configuration method includes:

in step S31, receiving a preset signaling sent by a base station, wherein the preset signaling is generated by the base station according to a first paging signaling sent by a core network, the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;

in step S32, extracting the flight path information from the preset signaling; and in step S33, configuring a flight path based on the flight path information.

In one embodiment, as for an unmanned aerial vehicle in an idle state, since no communication connection is established between the unmanned aerial vehicle and a base station, flight path information from a core network cannot be directly sent to the unmanned aerial vehicle through the base station. Therefore, a tracking area where the unmanned aerial vehicle is located can be determined first, and then a first paging signaling containing the flight path information can be sent to the base station in the tracking area, and the base station is instructed to send the flight path information to the unmanned aerial vehicle through a preset signaling through the first paging signaling.

After receiving the first paging signaling, the base station may generate the preset signaling which contains the flight path information according to the first paging signaling, and then may acquire the flight path information from the preset signaling when the unmanned aerial vehicle receives the preset signaling, and configures the flight path based on the flight path information. Compared with related technologies, the configuration of the flight path can be completed based on the operator's network, without establishing a dedicated link, and the configuration process is relatively simple.

Figure 7:
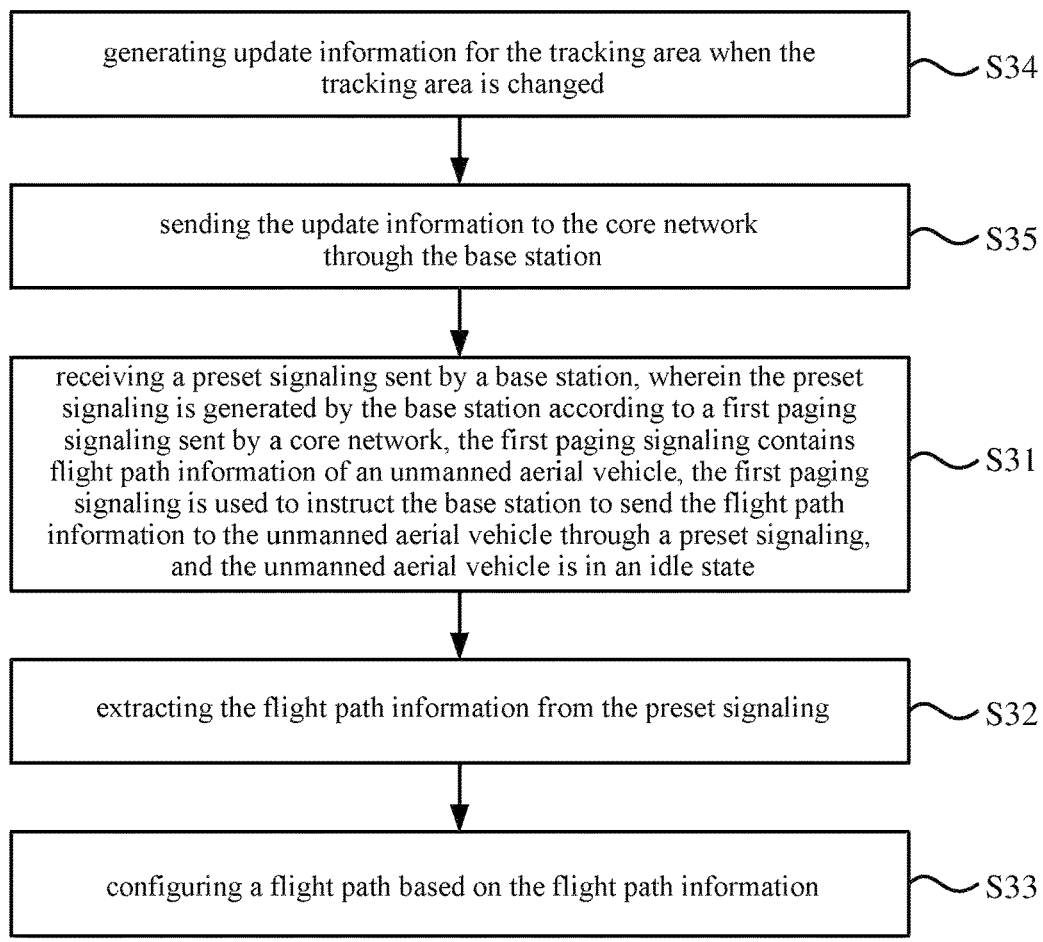
FIG. 7 is a schematic flowchart showing yet another method for configuring a flight path according to an embodiment of the present disclosure.

FIG. 7 is a schematic flow chart showing yet another method for configuring a flight path according to an embodiment of the present disclosure. As shown in FIG. 7, based on the embodiment shown in FIG. 6, the method further includes:

in step S33, generating update information for the tracking area when the tracking area changes;

in step S34, sending the update information to the core network through the base station.

In one embodiment, the tracking area where the unmanned aerial vehicle is located can change during movement of the unmanned aerial vehicle. When the tracking area where the unmanned aerial vehicle is located changes, the update request information for the tracking area can be generated and sent to the core network through the base station, for the core network to determine the tracking area where the unmanned aerial vehicle is located.

It should be noted that step S33 and step S34 can be executed before step S31 as shown in FIG. 7, or can be executed after step S32. The specific execution sequence is not limited in the present disclosure. The update information for the tracking area can be generated as long as the tracking area is changed, that is, step S33 and step S34 are executed.

Optionally, the preset signaling includes at least one of:
a second paging signaling, a radio resource control signaling, and a medium access control layer control unit.

In one embodiment, the base station may broadcast the second paging signaling, and the second paging signaling may include the identification information of the unmanned aerial vehicle. The unmanned aerial vehicle may monitor the base station. When the second paging signaling is monitored, it can be determined that the content in the second paging signaling needs to be acquired based on the identification information, for example, the flight path information carried by the second paging signaling is acquired. In this case, even if no communication connection is established between the unmanned aerial vehicle and the base station, the flight path information can still be obtained from the second paging signaling.

In one embodiment, the unmanned aerial vehicle may establish a communication connection with the base station first, and when there is a communication connection with the base station, the RRC signaling or MAC CE carrying the flight path information may be received from the base station, so that the flight path information may be acquired from the core network.

Figure 8:
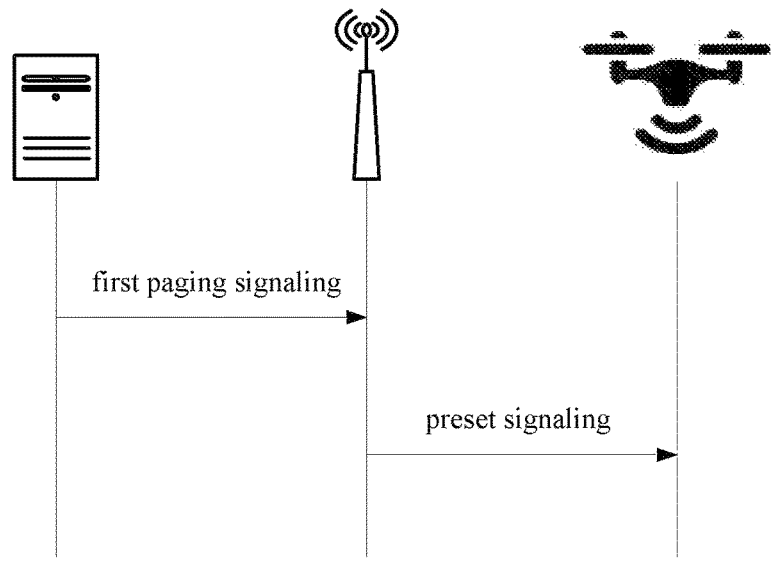
FIG. 8 is a schematic diagram showing interaction of a core network, a base station, and an unmanned aerial vehicle according to an embodiment of the present disclosure.

FIG. 8 is a schematic diagram showing the interaction of a core network, a base station, and an unmanned aerial vehicle according to an embodiment of the present disclosure.

As shown in FIG. 8, after obtaining the flight path information of the unmanned aerial vehicle in the idle state, the core network can send the first paging signal to the base station in the tracking area where the unmanned aerial vehicle is located. The command contains flight path information, and the first paging signaling can instruct the base station to send the flight path information to the unmanned aerial vehicle through the preset signaling.

After the base station receives the first paging signaling, the preset signaling may be generated according to the first paging signaling. The preset signaling includes flight path information, and the base station sends the preset signaling to the unmanned aerial vehicle. For example, when no communication connection is established with the unmanned aerial vehicle, the preset signaling can be sent by broadcasting, and after the communication connection is established with the unmanned aerial vehicle, the preset signaling can be sent to the unmanned aerial vehicle directedly.

After receiving the preset signaling, the unmanned aerial vehicle can obtain the flight path information since the preset signaling contains the flight path information, and then configure the flight path according to the flight path information, and fly according to the configured flight path.

Corresponding to the foregoing embodiments of the flight path configuration method, the present disclosure further provides embodiments of the flight path configuration apparatus.

Figure 9:
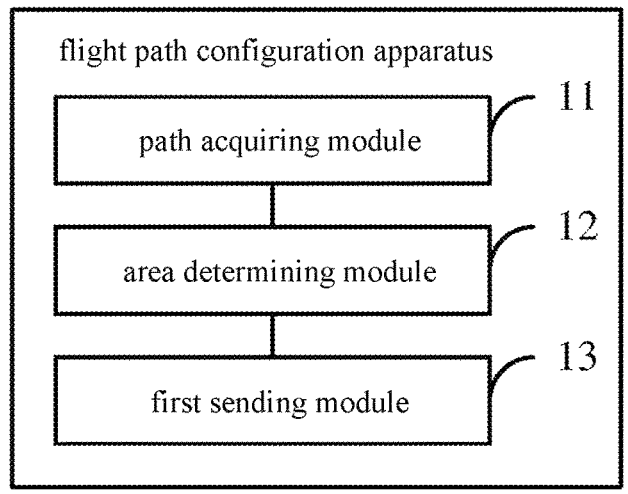
FIG. 9 is a schematic block diagram showing a flight path configuration apparatus according to an embodiment of the present disclosure.

FIG. 9 is a schematic flowchart illustrating an apparatus for configuring a flight path according to an embodiment of the present disclosure. The flight path configuration apparatus shown in this embodiment can be applied to a core network. The core network can communicate with a base station. The base station can communicate with a user device. The user device can be an unmanned aerial vehicle. The unmanned aerial vehicle may be a drone, an unmanned airship, or the like. The base station and the user device may communicate based on LTE (Long Term Evolution) communication or NR (New Radio) communication.

As shown in FIG. 9, the flight path configuration apparatus includes:
a path acquiring module 11, configured to acquire flight path information of an unmanned aerial vehicle, wherein the unmanned aerial vehicle is in an idle state;
an area determining module 12, configured to determine a tracking area where the unmanned aerial vehicle is located, wherein at least one base station is located in the tracking area; and
a first sending module 13, configured to send a first paging signaling to the base station, wherein the first paging signaling contains the flight path information, and the first paging signaling is used to instruct the base station to send the flight path information to the unmanned aerial vehicle through a preset signaling.

Optionally, the path acquiring module is configured to acquire the flight path information from a terminal running an unmanned aerial vehicle management system, wherein the unmanned aerial vehicle management system is used to configure the flight path information for the unmanned aerial vehicle.

Figure 10:
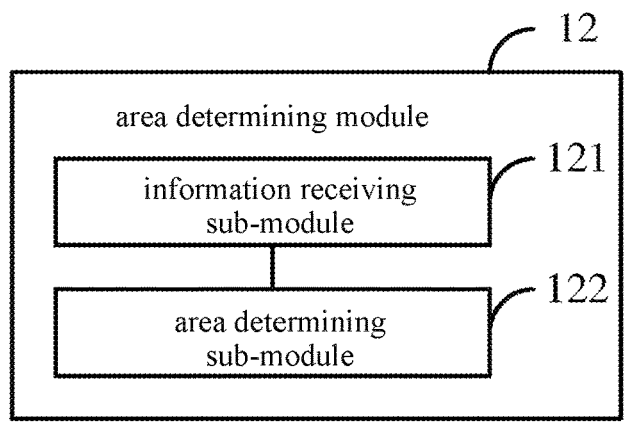
FIG. 10 is a schematic block diagram showing an area determining module according to an embodiment of the present disclosure.

FIG. 10 is a schematic block diagram showing an area determining module according to an embodiment of the present disclosure. As shown in FIG. 10, on the basis of the embodiment shown in FIG. 8, the area determining module 12 includes:
an information receiving sub-module 121, configured to receive update information about the tracking area of the unmanned aerial vehicle;
an area determining sub-module 122, configured to determine the tracking area where the unmanned aerial vehicle is located based on the update information.

Optionally, the preset signaling includes at least one of:
a second paging signaling, a radio resource control signaling, and a medium access control layer control unit.

Figure 11:
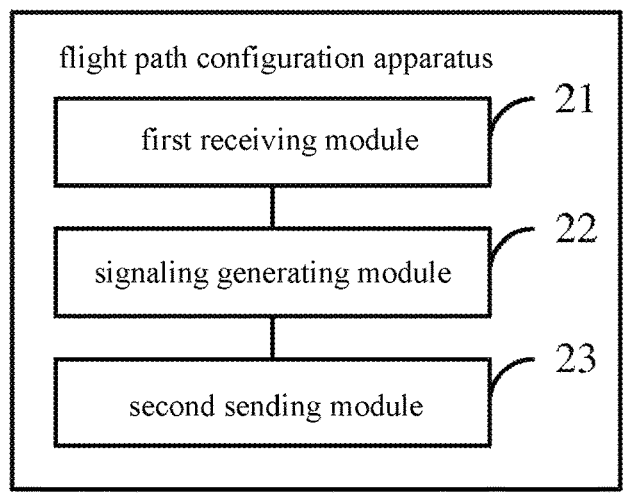
FIG. 11 is a schematic block diagram showing still another flight path configuration apparatus according to an embodiment of the present disclosure.

FIG. 11 is a schematic flow chart showing yet another apparatus for configuring a flight path according to an embodiment of the present disclosure. The flight path configuration apparatus shown in this embodiment can be applied to a base station. The base station can communicate with a core network. The base station can communicate with a user device. The user device can be an unmanned aerial vehicle. The unmanned aerial vehicle may be a drone, an unmanned airship, or the like. The base station and the user device may communicate based on LTE communication or NR communication.

As shown in FIG. 11, the flight path configuration apparatus includes:
a first receiving module 21, configured to receive a first paging signaling sent by a core network, wherein the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;

a signaling generating module 22, configured to generate the preset signaling based on the first paging signaling; and a second sending module 23, configured to send the flight path information to the unmanned aerial vehicle through the preset signaling.

Figure 12:
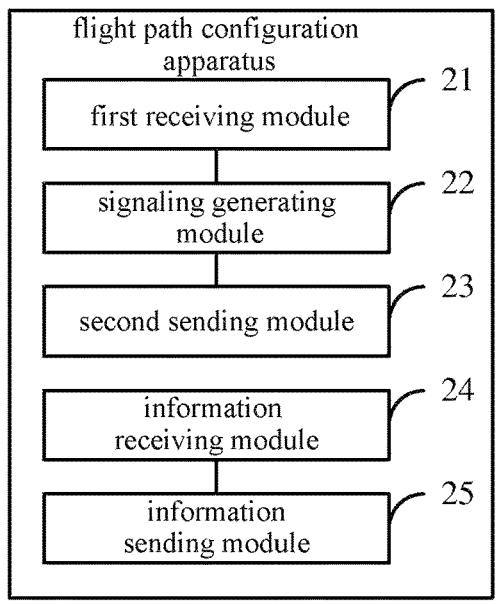
FIG. 12 is a schematic block diagram showing still another flight path configuration apparatus according to an embodiment of the present disclosure.

FIG. 12 is a schematic block diagram showing still another flight path configuration apparatus according to an embodiment of the present disclosure. As shown in FIG. 12, based on the embodiment shown in FIG. 11, the flight path configuration apparatus further includes:

an information receiving module 24, configured to receive update request information for the tracking area generated when the tracking area of the unmanned aerial vehicle changes;

an information sending module 25, configured to send the update request information to the core network.

Optionally, the preset signaling includes at least one of:

a second paging signaling, a radio resource control signaling, and a medium access control layer control unit.

Figure 13:
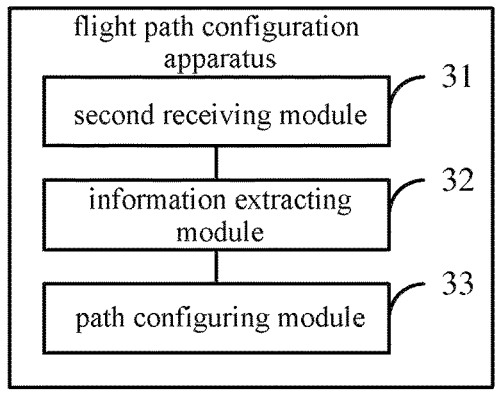
FIG. 13 is a schematic block diagram showing still another flight path configuration apparatus according to an embodiment of the present disclosure.

FIG. 13 is a schematic flow chart showing yet another apparatus for configuring a flight path according to an embodiment of the present disclosure. The flight path configuration shown in this embodiment can be applied to the unmanned aerial vehicle. The unmanned aerial vehicle may be a drone, an unmanned airship, or the like. The base station and the unmanned aerial vehicle may communicate based on LTE communication or NR communication.

As shown in FIG. 13, the flight path configuration apparatus includes:

a second receiving module 31, configured to receive a preset signaling sent by a base station, wherein the preset signaling is generated by the base station according to a first paging signaling sent by a core network, the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;

an information extracting module 32, configured to extract the flight path information from the preset signaling; and a path configuring module 33, configured to configure a flight path based on the flight path information.

Figure 14:
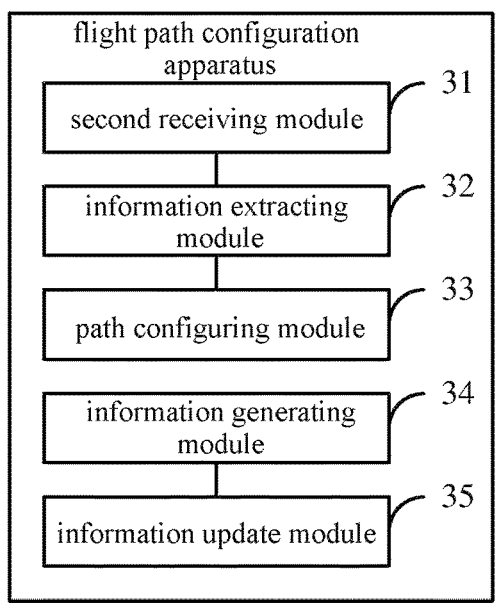
FIG. 14 is a schematic block diagram showing still another flight path configuration apparatus according to an embodiment of the present disclosure.

FIG. 14 is a schematic block diagram showing yet another flight path configuration apparatus according to an embodiment of the present disclosure. As shown in FIG. 14, on the basis of the embodiment shown in FIG. 13, the apparatus further includes:

an information generating module 34, configured to generate update information for the tracking area when the tracking area changes;

an information update module 35, configured to send the update information to the core network through the base station.

Optionally, the preset signaling includes at least one of:

a second paging signaling, a radio resource control signaling, and a medium access control layer control unit.

Regarding the apparatus in the foregoing embodiment, the specific manner in which each module performs operations has been described in detail in the related method embodiment, which will not be elaborated herein.

For the apparatus embodiments, since they basically correspond to the method embodiments, the description for related parts may refer to the description of the method embodiments. The apparatus embodiments described above are merely illustrative. The units described as separate components may or may not be physically separated, and the components displayed as units may or may not be physical units, that is, they may be located in one place, or can be distributed to multiple network units. Some or all of the modules may be selected according to actual needs to achieve the objective of the solutions of the embodiments. Those of ordinary skill in the art can understand and implement it without creative work.

An embodiment of the present disclosure also proposes an electronic device, including:

a processor;

memory for storing instructions executable by the processor, wherein the processor is configured to implement the method according to any of the foregoing embodiments.

The embodiment of the present disclosure also proposes a computer-readable storage medium with computer programs stored thereon, wherein the program implements steps in the method according to any of the foregoing embodiments when executed by a processor.

Figure 15:
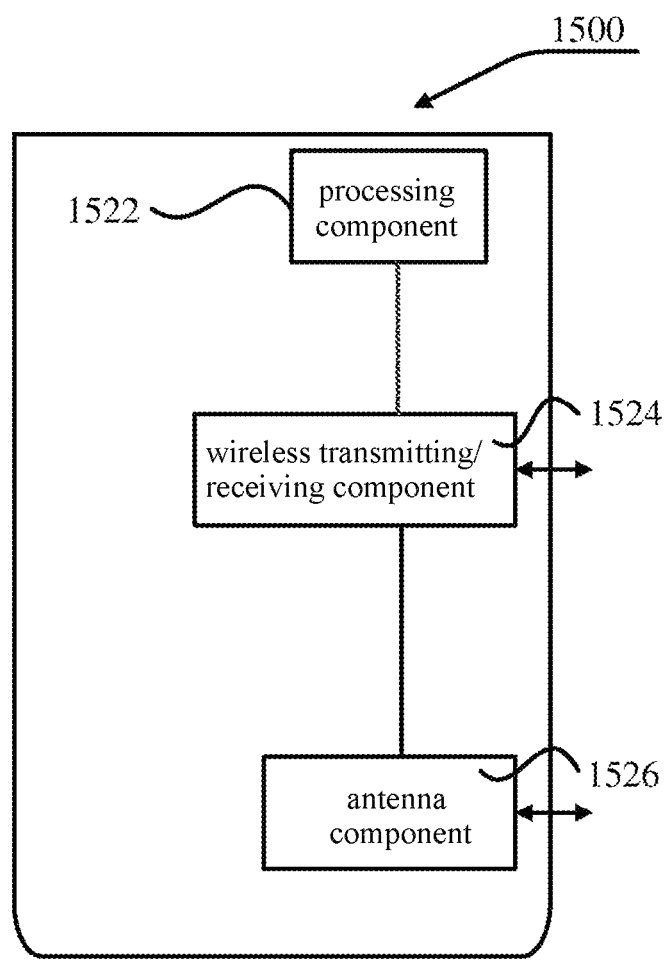
FIG. 15 is a schematic structural diagram showing a flight path configuration apparatus according to an embodiment of the present disclosure.

As shown in FIG. 15, FIG. 15 is a schematic structural diagram of a flight path configuration apparatus 1500 according to an embodiment of the present disclosure. The apparatus 1500 may be provided as a base station. Referring to FIG. 15, the apparatus 1500 includes a processing component 1522, a wireless transmitting/receiving component 1524, an antenna component 1526, and a signal processing part specific to a wireless interface. The processing component 1522 may further include one or more processors. One of the processors in the processing component 1522 may be configured to implement the steps in the method described in any of the foregoing embodiments.

Figure 16:
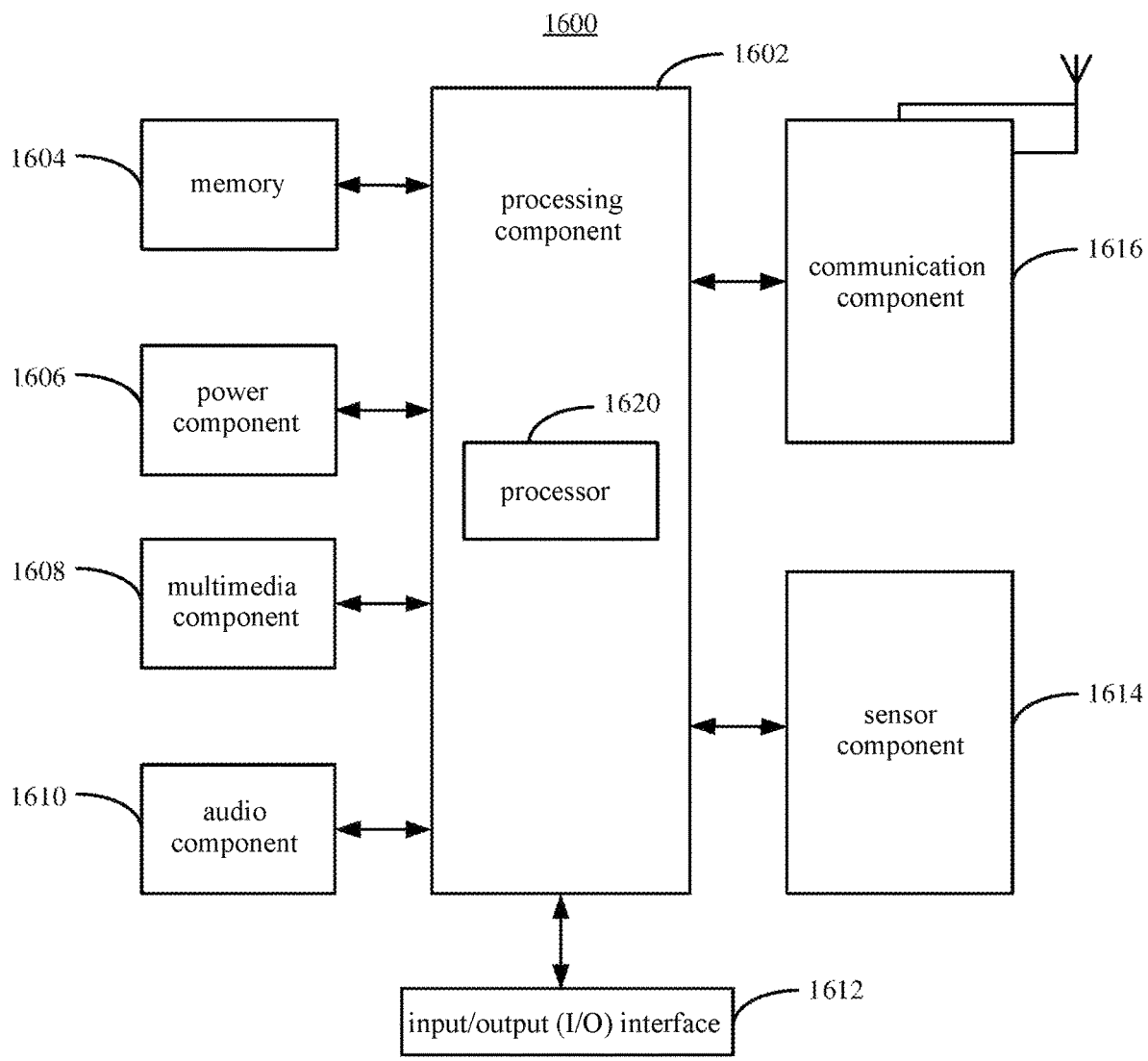
FIG. 16 is a schematic block diagram showing a flight path configuration apparatus according to an embodiment of the present disclosure.

FIG. 16 is a schematic block diagram showing a flight path configuration apparatus 1600 according to an embodiment of the present disclosure. For example, the apparatus 1600 may be a mobile phone, a computer, a digital broadcasting terminal, a messaging device, a game console, a tablet device, a medical device, a fitness device, a personal digital assistant, or the like.

Referring to FIG. 16, the apparatus 1600 may include one or more of the following components: a processing component 1602, memory 1604, a power component 1606, a multimedia component 1608, an audio component 1610, an input/output (I/O) interface 1612, a sensor component 1614, and a communication component 1616.

The processing component 1602 typically controls the overall operations of the apparatus 1600, such as the operations associated with display, telephone calls, data communications, camera operations, and recording operations. The processing component 1602 can include one or more processors 1620 to execute instructions to perform all or part of the steps in the above-described methods. Moreover, the processing component 1602 can include one or more modules to facilitate the interaction between the processing component 1602 and other components. For example, the processing component 1602 can include a multimedia module to facilitate the interaction between the multimedia component 1608 and the processing component 1602.

The memory 1604 is configured to store various types of data to support the operation of the apparatus 1600. Examples of such data include instructions for any application or method operated on the apparatus 1600, such as the contact data, the phone book data, messages, pictures, videos, and the like. The memory 1604 can be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the apparatus 1600. The power component 1606 can include a power management system, one or more power sources, and other components associated with the generation, management, and distribution of power in the apparatus 1600.

The multimedia component 1608 includes a screen providing an output interface between the apparatus 1600 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. When the apparatus 1600 is in an operation mode, such as a photographing mode or a video mode, the front camera and/or the rear camera can receive external multimedia data. Each of the front camera and the rear camera may be a fixed optical lens system or have focus and optical zoom capability.

The audio component 1610 is configured to output and/or input an audio signal. For example, the audio component 1610 includes a microphone (MIC) configured to receive an external audio signal when the apparatus 1600 is in an operation mode, such as a call mode, a recording mode, and a voice recognition mode. The received audio signal may be further stored in the memory 1604 or sent via the communication component 1616. In some embodiments, the audio component 1610 also includes a speaker for outputting the audio signal.

The I/O interface 1612 provides an interface between the processing component 1602 and peripheral interface modules, such as a keyboard, a click wheel, buttons, and the like. These buttons may include, but not limited to, a home button, a volume button, a starting button, and a locking button.

The sensor component 1614 includes one or more sensors for providing state assessments of various aspects of the apparatus 1600. For example, the sensor component 1614 can detect an open/closed state of the apparatus 1600, relative positioning of components, such as the display and the keypad of the apparatus 1600. The sensor component 1614 can also detect a change in position of one component of the apparatus 1600 or the apparatus 1600, the presence or absence of user contact with the apparatus 1600, an orientation, or an acceleration/deceleration of the apparatus 1600, and a change in temperature of the apparatus 1600. The sensor component 1614 can also include a proximity sensor configured to detect the presence of nearby objects without any physical contact. The sensor component 1614 can also include a light sensor, such as a CMOS or CCD image sensor, configured to use in imaging applications. In some embodiments, the sensor component 1614 can also include an accelerometer sensor, a gyroscope sensor, a magnetic sensor, a pressure sensor, or a temperature sensor.

The communication component 1616 is configured to facilitate wired or wireless communication between the apparatus 1600 and other devices. The apparatus 1600 can access a wireless network based on a communication standard, such as Wi-Fi, 2G, 3G or a combination thereof. In an exemplary embodiment, the communication component 1616 receives broadcast signals or broadcast associated information from an external broadcast management system via a broadcast channel. In an exemplary embodiment, the communication component 1616 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1600 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the flight path configuration methods of any one of the above embodiments.

In an exemplary embodiment, there is also provided a non-transitory computer-readable storage medium including instructions, such as memory 1604 including instructions executable by the processor 1620 of the apparatus 1600 to perform the above methods. For example, the non-transitory computer readable storage medium may be a ROM, a random-access memory (RAM), a CD-ROM, a magnetic tape, a floppy disc, and an optical data storage device, or the like.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

It should be noted that in this article, relational terms such as first and second are only used to distinguish one entity or operation from another entity or operation, and do not necessarily require or imply that there is any such actual relationship or sequence between these entities or operations. The terms "include", "contain" or any other variants thereof are intended to cover non-exclusive inclusion, so that a process, method, article or device including a series of elements not only includes those elements, but also includes other elements not explicitly listed, or also include elements inherent to such processes, methods, articles, or devices. If there are no more restrictions, the element defined by the sentence "including a . . . " does not exclude the existence of other same elements in the process, method, article, or device that includes the element.

The method and apparatus provided by the embodiments of the present disclosure are described in detail above. Specific examples are used in this article to illustrate the principles and implementation of the present disclosure. The description of the above embodiments is only used to help understand the method and core idea of the present disclosure. Meanwhile, for those of ordinary skill in the art, according to the idea of the present disclosure, there will be changes in the specific implementation and the scope of application. In summary, the content of this specification should not be construed as limitation to the present disclosure.

What is claimed is:

1. A flight path configuration method, comprising:
acquiring, by a core network, flight path information of an unmanned aerial vehicle;
determining, by the core network, that the unmanned aerial vehicle is in an idle state;
determining, by the core network, a tracking area where the unmanned aerial vehicle is located, wherein at least one base station is located in the tracking area; and
sending, by the core network, a first paging signaling containing the flight path information to the base station to instruct the base station to send the flight path information to the unmanned aerial vehicle through a preset signaling.

2. The method according to claim 1, wherein the acquiring flight path information of an unmanned aerial vehicle comprises:
acquiring the flight path information from a terminal running an unmanned aerial vehicle management system, wherein the unmanned aerial vehicle management system is used to configure the flight path information for the unmanned aerial vehicle.

3. The method according to claim 1, wherein the determining a tracking area where the unmanned aerial vehicle is located comprises:
receiving update information about the tracking area of the unmanned aerial vehicle;
determining the tracking area where the unmanned aerial vehicle is located based on the update information.

4. The method according to claim 1, wherein the preset signaling comprises at least one of:
a second paging signaling, a radio resource control signaling, or a medium access control layer control unit.

5. A flight path configuration method, comprising:
receiving, by a base station, a first paging signaling sent by a core network, wherein the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;
generating, by the base station, the preset signaling based on the first paging signaling; and
sending, by the base station, the flight path information to the unmanned aerial vehicle through the preset signaling.

6. The method according to claim 5, further comprising:
receiving update request information for the tracking area generated when the tracking area of the unmanned aerial vehicle changes;
sending the update request information to the core network.

7. The method according to claim 5, wherein the preset signaling comprises at least one of:
a second paging signaling, a radio resource control signaling, or a medium access control layer control unit.

8. A flight path configuration method, comprising:
receiving, by an unmanned aerial vehicle, a preset signaling sent by a base station, wherein the preset signaling is generated by the base station according to a first paging signaling sent by a core network, the first paging signaling contains flight path information of an unmanned aerial vehicle, the first paging signaling is used to instruct the base station to send the flight path information to the unmanned aerial vehicle through a preset signaling, and the unmanned aerial vehicle is in an idle state;
extracting, by the unmanned aerial vehicle, the flight path information from the preset signaling; and
configuring, by the unmanned aerial vehicle, a flight path based on the flight path information.

9. The method according to claim 8, further comprising:
generating update information for the tracking area when the tracking area changes;
sending the update information to the core network through the base station.

10. The method according to claim 8, wherein the preset signaling comprises at least one of:
a second paging signaling, a radio resource control signaling, or a medium access control layer control unit.

11. The method according to claim 1, further comprising:
determining, by the core network, a base station from the at least one base station;
establishing, by the base station, a RRC connection with the unmanned aerial vehicle based on the first paging signal;
receiving, by the unmanned aerial vehicle, the flight path information through the preset signaling based on the RRC connection; and
the unmanned aerial vehicle flying according to the flight path information.

12. A flight path configuration apparatus implementing the flight path configuration method according to claim 1, comprising:
a processor; and
memory storing instructions executable by the processor;
wherein the processor is configured to execute steps of the flight path configuration method.

13. The apparatus according to claim 12, wherein the processor is further configured to acquire the flight path information from a terminal running an unmanned aerial vehicle management system, wherein the unmanned aerial vehicle management system is used to configure the flight path information for the unmanned aerial vehicle.

14. The apparatus according to claim 12, wherein the processor is further configured to:
receive update information about the tracking area of the unmanned aerial vehicle; and
determine the tracking area where the unmanned aerial vehicle is located based on the update information.

15. The apparatus according to claim 12, wherein the preset signaling comprises at least one of:
a second paging signaling, a radio resource control signaling, or a medium access control layer controller.

16. A flight path configuration apparatus implementing the flight path configuration method according to claim 5, comprising:

a processor; and memory storying instructions executable by the processor;

wherein the processor is configured to execute steps of the flight path configuration method.

17. The apparatus according to claim 16, wherein the processor is further configured to:

receive update request information for the tracking area generated when the tracking area of the unmanned aerial vehicle changes; and send the update request information to the core network.

18. The apparatus according to claim 16, wherein the preset signaling comprises at least one of:

a second paging signaling, a radio resource control signaling, or a medium access control layer controller.

19. A flight path configuration apparatus implementing the flight path configuration method according to claim 8, comprising:

a processor; and memory storing instructions executable by the processor;

wherein the processor is configured to execute steps of the flight path configuration method.

20. The apparatus according to claim 19, wherein the processor is further configured to:

generate update information for the tracking area when the tracking area changes; and send the update information to the core network through the base station.

* * * * *